Patented July 5, 1927.

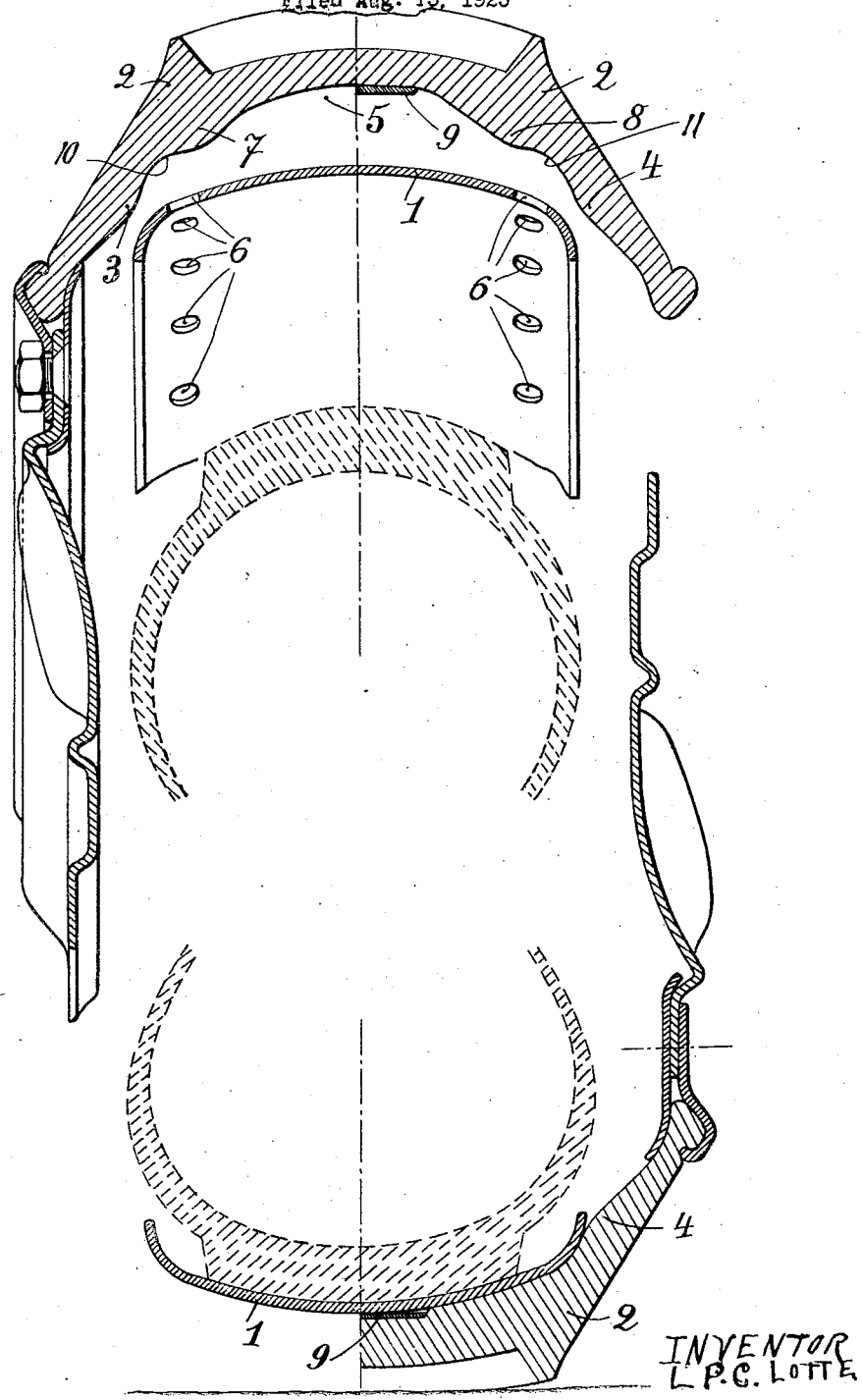

1,634,589

UNITED STATES PATENT OFFICE.

LUCIEN PAUL CELESTIN LOTTE, OF PARIS, FRANCE.

TIRE PROTECTOR.

Application filed August 15, 1925, Serial No. 50,463, and in France August 18, 1924.

The present invention relates to improvements in tire protectors of the type in which the wheel rolls within an annular outer tire whose diameter is larger than that of the wheel.

The principal drawbacks inherent in the known apparatus are (1) the difficulty of evacuating the heat produced in the protecting element; (2) the influence of the mass of the protecting element, which exaggerates the effects due to the forces of inertia, hinders the protecting element from assuming instantaneously speed variations, due to obstacles encountered on the road, and subjects it in its rapid movements to considerable destructive effects; (3) the tendency to side slipping, which upon a perfectly smooth road, such as asphalt, for example, causes a very slight deformation of the protecting device in contact with the ground.

The improvements according to my said invention consist in separating and rendering independent of one another the metallic ring and the elastic outer tire covering and protecting the same, this separation and independence being made in such manner that the outer tire forms in itself a ring whose diameter is greater than that of the metallic ring, this latter having as usual a diameter which is much larger than that of the wheel tire to be protected.

In this manner I obtain not only a "wheel within a wheel", but in fact a wheel (which is that to be protected) rolling within a metallic ring which is itself disposed so as to roll within an outer tire. This latter consists of an elastic tire, for example of solid rubber which supports the parts serving for guiding purposes and gives to the whole system its form.

The appended drawing shows in transverse section a constructional form of the device according to my said invention.

1 is the metallic ring, and 2 the outer tire of larger diameter.

The metallic ring 1 is guided in its movement in the interior of the outer tire 2 by the cooperation of its external convex form with the two circular flanges 3 and 4 of the internal surface of the said tire, which form the edges of grooves 10 and 11 into which the said ring 1 is fitted. The ring 1 bears at its lower part, on two ribs 7 and 8 which are formed upon the inner surface of the tire 2. The said ribs have to a certain extent the function of rails for the external surface of the ring 1, and due to the double tapered cross shape of the latter, the ring 1 will be guided and will be constantly brought into the proper position somewhat after the manner of the wheels upon railroads.

Due to this arrangement, I obtain a better cooling of the interior of the apparatus, for in fact since there is a certain space at the upper part between the ring 1, the outer tire 2 and the wheel proper to be protected, the current of air for the cooling of the device may come into contact at the same time with both faces of the part 1, while continuing to circulate upon the internal surface of the part 2 and the external surface of the tire of the wheel to be protected. A certain number of holes 6, suitably formed in the ring 1, may be used to facilitate the circulation of the air from one face to the other.

The efficacity of the cooling will thus be considerably augmented due to the increased development of the surfaces to be cooled. This may be made more effective inasmuch as the space between the ribs 7 and 8 will form on the internal surface of the outer tire 2 and at its middle part a groove 5, which thus provides a larger cross section for the flow of the ventilating current of air. At the same time the said groove, which provides for an outer convex cross shape of the tire 2 has the effect of increasing in the lengthwise direction the surface of deformation of the said tire upon flat ground, and due to its cooperation with the outer surface of the ring 1, the surface of contact of the tire 2 with the ground, as shown in the figure, will be enlarged within all possible limits; so that the tendency to side slipping will be much diminished, and independently of all arrangements of a general nature acting for the same purpose, such as the use of relief designs or of nails suitably mounted on the outer surface of the tire 2.

Should it prove necessary in order to maintain the form of the said groove when inoperative or at reduced speeds, and to prevent the sinking of the tire 2 under the weight of the lateral cheeks, I may dispose within the same a thin and narrow strip of flexible steel band 9 whose diameter is as large as allowed by the groove 5.

Finally, it is obvious that the disposition in which the longitudinal oscillations of the ring 1 and of the tire 2 are rendered independent of each other, will have the effect of annulling the reactions, on the tires, of the forces of inertia which may be exercised upon the ring, and vice versa. The resistance of said ring should therefore be calculated with respect to its inertia alone, since this piece is in fact separated from the surrounding elements save at the point of contact with the ground; it may therefore be lightened, and its mass will become very small, so that it almost immediately yields to the asperities of the ground and therefore improves the suspension of the vehicle as well as the operating conditions of the wheel to be protected.

It will not be out of place to observe in this connection that the separation between the elastic tire 2—which is further increased by the presence of the groove 5—and the ring 1, will be most advantageous in producing an absorption of the shocks coming upon the ring 1, due to raised obstacles on the road.

Having thus described my apparatus, what I claim as new therein, and my own invention, is:

1. In a protector for wheel tires, the combination of an annular outer tire, a wheel within this tire, this wheel being of a diameter which is smaller than that of the interior of the said tire, the said tire and the said wheel being entirely independent the one from the other, a metallic ring freely interposed between the said tire and the said wheel and separating these elements, the said metallic ring having an external diameter which is smaller than the internal diameter of the said tire and an internal diameter which is larger than the diameter of the said wheel.

2. In a protector for wheel tires, the combination of an annular outer tire, a wheel within this tire, this wheel being of a diameter which is smaller than the internal diameter of the said tire, the said tire and the said wheel being entirely independent the one from the other, a metallic ring freely interposed between the said tire and the said wheel and separating these elements, the said metallic ring having an external diameter which is larger than that of the said wheel, the said tire being provided upon its internal surface with inwardly projecting ribs forming grooves on each side and adapted to act as guides for the said ring.

3. In a protector for wheel tires, the combination of an annular outer tire, a wheel within the said tire, this wheel being of a diameter which is smaller than the internal diameter of the said tire, the said tire and the said wheel being entirely independent the one from the other, a metallic ring freely interposed between the said tire and the said wheel, and separating these elements, the said metallic ring having an external diameter which is smaller than the internal diameter of the said tire and an internal diameter which is larger than that of the said wheel, the said tire being provided upon its surface with inwardly projecting ribs, forming grooves on both sides and adapted to act as guides for the said ring, the part of the said tire between the said ribs being concave so as to leave a larger space between the said tire and the said metallic ring.

4. In a protector for wheel tires, the combination of an annular outer tire, a wheel within this tire, this wheel being of a diameter which is smaller than the internal diameter of the said tire, the said tire and the said wheel being entirely independent the one from the other, a metallic ring freely interposed between the said tire and the said wheel, and separating these elements, the said metallic ring having an external diameter which is smaller than the internal diameter of the said tire and an internal diameter which is larger than the diameter of the said wheel, the said external tire being inwardly bulged and being adapted to be deformed in contact with the ground.

In testimony whereof I have hereunto affixed my signature.

LUCIEN PAUL CELESTIN LOTTE.